United States Patent [19]

Tyner

[11] Patent Number: 5,582,787
[45] Date of Patent: Dec. 10, 1996

[54] PLASTIC UPHOLSTERY CORE FORMING METHOD

[76] Inventor: Jeffrey D. Tyner, 2879 Canyonside Ct. NE., Grand Rapids, Mich. 49505

[21] Appl. No.: 295,235

[22] Filed: Aug. 24, 1994

[51] Int. Cl.⁶ ............................ B29C 43/04; B29C 43/20
[52] U.S. Cl. .................... 264/163; 264/238; 264/321
[58] Field of Search .................................... 264/321, 163, 264/296, 238

[56] References Cited

U.S. PATENT DOCUMENTS

| | | |
|---|---|---|
| 1,118,315 | 11/1914 | Trist . |
| 2,217,137 | 10/1940 | Roth et al. . |
| 3,335,892 | 8/1967 | Hildreth .................................... 264/321 |
| 3,400,040 | 9/1968 | Osgood .................................... 264/321 |
| 3,474,655 | 10/1969 | Fulkerson . |
| 3,584,094 | 6/1971 | Rock et al. . |
| 4,243,456 | 1/1981 | Cesano .................................... 264/163 |
| 4,327,049 | 4/1982 | Miller ...................................... 264/163 |
| 4,331,360 | 5/1982 | Roudybush et al. . |
| 4,698,252 | 10/1987 | Koch et al. ............................... 264/321 |
| 4,940,557 | 7/1990 | Kimura . |
| 4,996,092 | 2/1991 | Francis et al. ........................... 264/321 |
| 5,023,033 | 6/1991 | Cakmakci . |
| 5,125,606 | 6/1992 | Cassano et al. . |
| 5,158,255 | 10/1992 | Fuller . |
| 5,209,880 | 5/1993 | Miwa . |
| 5,223,201 | 6/1993 | Masui et al. . |
| 5,238,640 | 8/1993 | Masui et al. ............................. 264/296 |
| 5,284,608 | 2/1994 | Vismara . |

*Primary Examiner*—Allan R. Kuhns
*Attorney, Agent, or Firm*—Ian C. McLeod; Mary M. Moyne

[57] ABSTRACT

A wrist support (10) and method for constructing the wrist support is described. The wrist support includes a base (12) with a cushion layer (14) mounted on the top surface (12A) and an outer covering (16) surrounding the base and cushion layer. The bottom surface (12B) of the base has an adhesive (13) which is protected by a release paper (15). The release paper is removed in order to secure the ends (16A) of the outer covering to the base. The wrist support is constructed from a sheet of base material (36) and a sheet of cushion material (38) which are cut into a wrist support preform (26) in a mold (20). The sheets are inserted between a first half (22) and a second half (32) of the mold with the base adjacent the second half of the mold. The first half of the mold is then moved downward into contact with the second half which causes the second half to also move downward and which enables the plunger (34) of the second half to extend into the indentation (24) of the first half. As the plunger enters the indentation the cutting edges (34C) of the sidewalls (34A) of the plunger cut the sheets of material into the shape of the wrist support. The first and second halves of the mold continue to move downward causing the plunger to compress the cut base and cut cushion layer against the top (24B) of the indentation with the edges (12C) of the base adjacent the curved portion (24C) of the indentation.

13 Claims, 3 Drawing Sheets

PLASTIC UPHOLSTERY CORE FORMING METHOD

BACKGROUND OF THE INVENTION

(1) Field of the Invention

The present invention relates to a wrist support for use adjacent a keyboard during typing and a method for constructing the wrist support. In particular, the present invention relates to a wrist support for use adjacent a keyboard during typing which has a cushion layer on a base. The base has rounded edges around its perimeter and the cushion layer extends over the rounded edges of the base. An outer covering extends over the cushion layer and the base and acts to hold the edges of the cushion layer over the rounded edges of the base. The wrist support preform is constructed by a mold which first simultaneously cuts a sheet of base material and a sheet of cushion material to form the base and the cushion layer and then rounds the edges of the base by compressing the cut base with the cushion layer in the mold in the fully closed position.

(2) Prior Art

The prior art has shown various methods of forming and cutting laminated members using a single combining molding and cutting process. Illustrative are U.S. Pat. No. 5,023,033 to Cakmakci and U.S. Pat. No. 5,223,201 to Masui et al.

Cakmakci describes a decorative plastic trim strip and method and apparatus for forming. The trim is constructed of a plastic material and has two different layers. To cut and reshape the end of the trim, the trim is placed in the mold with the aesthetic outer surface down. The first mold has a cavity within which the trim rests. The first mold section is kept cool such that during cutting and reforming, the outer surface remains cool in order to maintain its appearance. The second mold section is heated in order to reshape the base or inner layer of the trim during cutting and reforming. The trim is cut and remolded by moving the first and second mold sections together. A knife edge extending upward from the first mold section forces a portion of the outer surface against the second mold section and places that portion of the outer surface in the same plane as the inner face of the trim. The knife edge also cuts the flash from the trim after molding. This method uses heat for reshaping of a previously cut end.

Masui et al describes a method of manufacturing a laminated body consisting of an upper layer member and a synthetic resin body, by the interaction of a male and female mold. A molten resin is used to form the synthetic resin body during molding. The molding and cutting of the laminated body is conducted in the same step which eliminates alignment problems concerning the center points of the upper layer member and the synthetic resin body.

Also of interest are U.S. Pat. No. 1,118,315 to Trist; U.S. Pat. No. 2,217,137 to Roth et al; U.S. Pat. No. 3,474,655 to Fulkerson; U.S. Pat. No. 3,584,094 to Rock et al; U.S. Pat. No. 5,209,880 to Miwa; U.S. Pat. No. 5,284,608 to Vismara and U.S. Pat. No. 4,940,557 to Kimura which show various prior art methods of forming and cutting multilayer non-metallic members.

The prior art has also described different types of wrist support for use by typist. In particular, U.S. Pat. No. 5,125,606 to Cassano et al shows a wrist support including a longitudinally extending rigid board with a foam layer and a cover to compress the foam to form a cushion. The foam layer does not extend over the edges of the rigid board on which the foam layer is mounted. The wrist support also includes a non-skid backing on the underside of the wrist support.

In addition, U.S. Pat. No. 5,158,255 to Fuller shows a wrist rest having a relatively rigid tubular core with a layer of resilient foam disposed about the core and a relatively soft covering disposed about the foam layer. The foam extends completely around the core including covering both ends of the core except, preferably along the bottom.

Also of interest is U.S. Pat. No. 4,331,360 to Roudybush et al which shows a resilient accessory for use on seats or as an armrest cap.

There remains a need however for a method of molding and cutting a multilayer non-metallic member in which the molding and cutting is conducted simultaneously to produce a multilayered member in which the top layer extends over the edge of the base.

OBJECTS

Therefore it is an object of the present invention to provide a method for cutting and molding a two layered member in order to mold the top layer around the ends of the base. Further, it is an object of the present invention to provide a wrist support which has a top foam layer mounted on and extending over the edges of the base. Still further, it is an object of the present invention to provide a method for cutting and molding a multilayer non-metallic member which does not require heat. Still further, it is an object of the present invention to provide a method of molding and cutting a multilayer, non-metallic member in which the molding and cutting is conducted simultaneously. Finally, it is an object of the present invention to provide a quick and inexpensive method for producing a multilayer non-metallic member for use as a wrist support.

DETAILED DESCRIPTION OF THE PREFERRED EMBODIMENTS

Figure 1:
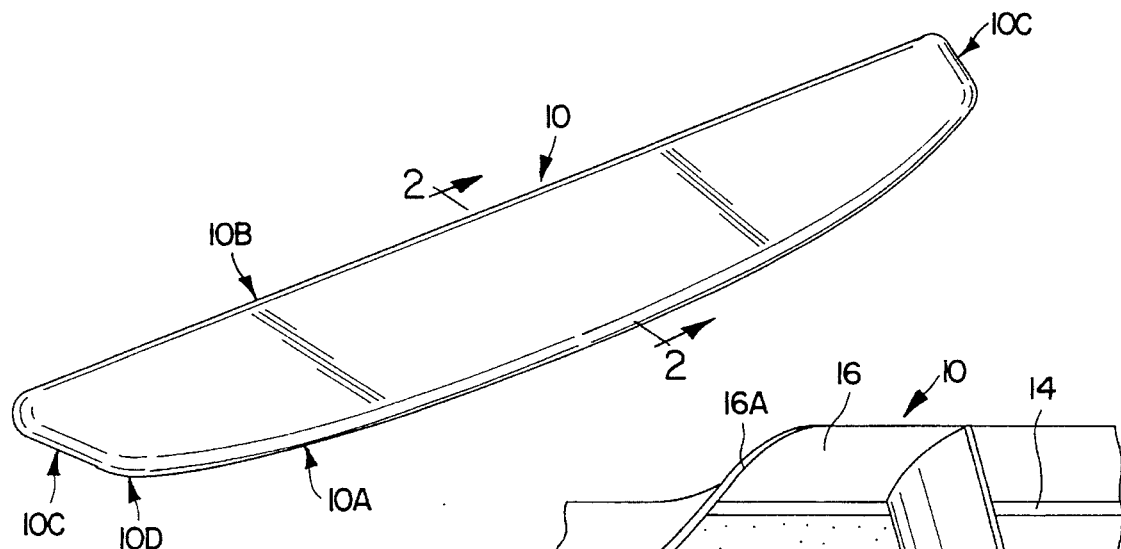
FIG. 1 is a perspective view of the wrist support 10 of the present invention.

The present invention relates to a wrist support constructed to be mounted adjacent a keyboard for use during typing, which comprises: a base having a top surface and a bottom surface with cut edges rounded upward towards the top surface extending around a perimeter of the base; a cut cushion layer mounted on the top surface of the base and conforming to the shape of the base and extending around and over the cut edges of the base; and an outer covering mounted on the cushion layer opposite the base and extending around the edges of the base and secured adjacent the bottom surface of the base such that the cushion extends around the perimeter of the base.

Further, the present invention relates to a method for constructing a wrist support preform constructed to be mounted adjacent a keyboard, the wrist support having a base with a top surface and a bottom surface with cut edges rounded upward toward the top surface around a perimeter of the base and a cut cushion layer mounted on the top surface of the base and conforming to the shape of the base and extending around and over the cut edges of the base, which comprises: providing a sheet of a base material having a top surface and a bottom surface and a sheet of cushion material in a mold having a first half and a second half movable between an open position with the first and second half of the mold separated and a closed position with the first and second half of the mold in contact, the first half having an indentation with sides and a top similar in shape and size to the wrist support with a curved portion between the top and the sides of the indentation and the second half having a plunger which is extendable into the indentation of the first half when the first and second half of the mold are positioned together with the mold in the closed position and with the base adjacent the plunger; moving the first half and the second half of the mold together, wherein the mold cuts the sheet of base material to form the cut cushion material and cut base and rounds the edges of the base to form the wrist support preform; and removing the cut base with the cut cushion layer from the mold.

Still further, the present invention relates to a method for constructing a wrist support constructed to be mounted adjacent a keyboard, the wrist support having a base with a top surface and a bottom surface with cut edges rounded upward towards the top surface around a perimeter of the base, a cut cushion layer mounted on the top surface of the base and conformed to the shape of the base and extending around and over the cut edges of the base and an outer covering surrounding the base and the cushion layer, which comprises: providing a sheet of a base material having a top surface and a bottom surface and a sheet of a cushion material in a mold having a first half and a second half movable between an open position with the first and second half of the mold separated and a closed position with the first and second half of the mold in contact, the first half having an indentation with sides and a top similar in shape and size to the wrist support with a curved portion between the top and the sides of the indentation and the second half having a plunger which is extendable into the indentation of the first half when the first and second half of the mold are positioned together with the mold in the closed position and with the base adjacent the plunger; moving the first half and the second half of the mold together, wherein the mold cuts the sheet of the base material and cushion material to form the cut cushion layer and the cut base and rounds the cut edges of the base towards the top surface of the base to form the wrist support; removing the cut base and cut cushion layer from the mold; mounting an outer covering over the cushion layer of the wrist support and around the rounded edges of the base wherein the outer covering moves the cut edges of the cushion layer over and around the rounded edges of the cut base; and securing the outer covering adjacent the bottom surface of the base.

The base of the wrist support is constructed of polystyrene and the cushion is made of foam. The indentation of the first half of the mold has four sidewalls which extend to a top of the indentation. A curved portion of the indentation is formed around the perimeter of the top of the mold where the sidewalls intersect the top. The sheets of base material and cushion material are cut simultaneously by shearing when the plunger of the second half of the mold enters the indentation of the first half of the mold. The mold is moved to the fully closed position with a force of 75 tons which instantaneously causes the cut edges of the base to become rounded due to contact with the curved portion of the indentation of the first half of the mold. The bottom surface of the base has an adhesive protected by a release paper which is removed to secure the outer covering adjacent the bottom surface of the base.

Figure 2A:
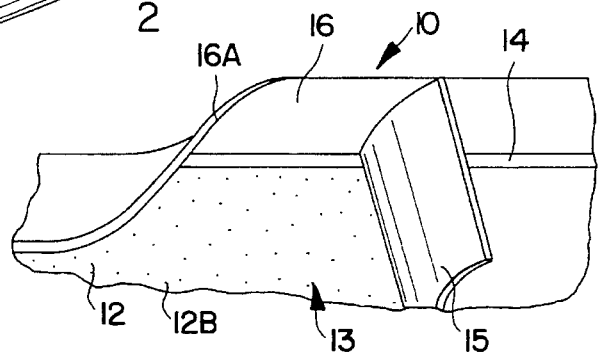
FIG. 2A is a partial bottom view of the wrist support 10 showing the adhesive 13 on the bottom surface 12B of the base 12 and the release paper 15.
Figure 2:
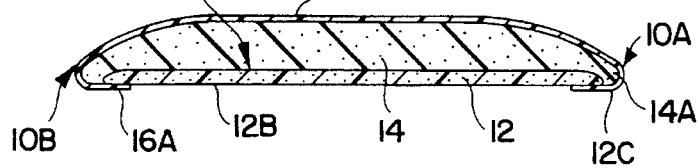
FIG. 2 is a cross-sectional view of the wrist support 10 of FIG. 1 showing the base 12, the cushion layer 14 and the outer covering 16.

FIGS. 1 to 2 show the wrist support 10 of the present invention. The wrist support 10 is for use adjacent a keyboard (not shown) to allow a user (not shown) to rest his wrists or another portion of his hands on the wrist support 10 during typing. The wrist support 10 is comprised of a base 12, a cushion layer 14 and an outer covering 16.

In the preferred embodiment, the wrist support 10 has a front edge 10A and a back edge 10B with two end edges 10C therebetween which form an essentially rectangular shape (FIG. 1). The front edge 10A is slightly shorter than the back edge 10B of the wrist support 10 such that the two end edges 10C are angled inward from the back edge 10B toward the front edge 10A. The length of both end edges 10C is preferably the same such that the wrist support 10 is symmetrical. The corners 10D of the wrist support 10 are preferably rounded in order to avoid possible injury to the user due to contact with a sharp corner. The rounded corners 10D also allow for easier mounting of the outer covering 16 around the base 12 and reduce the possibility of the corners 10D puncturing the outer covering 16. In the preferred embodiment, the wrist support 10 is 17.75 inches (45.09 cm) in length and 2.75 inches (6.99 cm) in width with a thickness of 0.50 inches (1.27 cm). The wrist support 10 is preferably mounted on an adaptor (not shown) which allows the wrist support 10 to be used with a variety of keyboards and keyboard attachments (not shown).

The base 12 of the wrist support 10 is essentially identical in shape and size to the wrist support 10. The base 12 has a top surface 12A and a bottom surface 12B with rounded and cut edges 12C which extend around the perimeter of the base 12 (FIG. 2). The edges 12C are rounded as a result of the molding process used to form the wrist support 10 (to be described in detail hereinafter). The base 12 is preferably constructed of a hard, rigid plastic such as polystyrene. Other plastics and other materials however can also be used. The base 12 is preferably 0.060 inches (0.152 cm) thick although the thickness of the base 12 would depend upon the particular application of wrist support 10. The bottom surface 12B of the base 12 is provided with an adhesive 13 which is protected by a release paper 15 (FIG. 2A). Preferably, the adhesive 13 is applied to the base 12 prior to the forming of the wrist support preform 26.

The cushion layer 14 of the wrist support 10 is mounted onto the top surface 12A of the base 12. The cushion layer 14 is preferably mounted onto the base 12 by an adhesive (not shown). The cushion layer 14 is preferably the same size as the base 12. The edges 14A of the cushion layer 14 are cut similarly to the base 12 but are not rounded. Thus, the cushion layer 14 is able to extend over the rounded edges 12C of the base 12 (FIG. 2). The cushion layer 14 is preferably constructed of standard upholstery foam such as that manufactured by Flexible Foam Products Inc. located in Elkhart, Ind. The thickness of the cushion layer 14 depends on the particular application of the wrist support 10. In the preferred embodiment, the cushion layer 14 is 0.50 inches (1.27 cm) thick.

The outer covering 16 is preferably constructed from a single sheet of material. The outer covering 16 is positioned over the cushion layer 14 opposite the base 12 such that the ends 16A of the outer covering 16 extend over the edges 12C and 14A of the base 12 and the cushion layer 14 and are secured onto the bottom surface 12B of the base 12 (FIGS. 2 and 2A). The ends 16A of the outer covering 16 are preferably secured by the adhesive 13 located on the bottom surface 12B of the base 12 (FIG. 2A). Other methods of attachment such as staples may also be used. The outer covering 16 is preferably pulled taut during securing such that the outer covering 16 moves the cut edges 14A of the cushion layer 14 down, over and around the cut and rounded edges 12C of the base 12. Thus, the edges 10A, 10B and 10C of the wrist support 10 contain the cushion layer 14 over the edges 12C of the base 12 such that the cushion layer 14 is between the outer covering 16 and the base 12 at the edges 10A, 10B and 10C of the wrist support 10. By providing the cushion layer 14 at the edges 10A, 10B and 10C of the wrist support 10, the comfort of the user is increased. The user is now able to comfortably rest his hands on the edges 10A, 10B and 10C of the wrist support 10 due to the cushion layer 14. In addition, the cushion layer 14 adds a layer of protection between the outer covering 16 and the base 12 which helps reduce the wear on the outer covering 16 due to contact between the edges 12C of the base 12 and the outer covering 16.

FIGS. 3 to 7 show the mold 20 which is used in the molding process to construct the wrist support 10 of the present invention. The mold 20 is constructed of a first half 22 and a second half 32 with the first half 22 preferably spaced above the second half 32. The first half 22 of the mold 20 has an indentation 24 which is essentially the same shape as the wrist support 10. It is understood that the shape and size of the indentation 24 and the corresponding shape and size of the plunger 34 of the second half 32 of the mold 20 (to be described in detail hereinafter) is dependent on the shape and size of the particular wrist support 10 being constructed. The indentation 24 has four sidewalls 24A which extend to the top 24B of the indentation 24. The indentation 24 has a curved portion 24C around the perimeter of the top 24B at the intersection of the sidewalls 24A and the top 24B. The curved portion 24C provides for rounding the cut edges 12C of the base 12 during forming of the wrist support preform 26.

Figure 3:
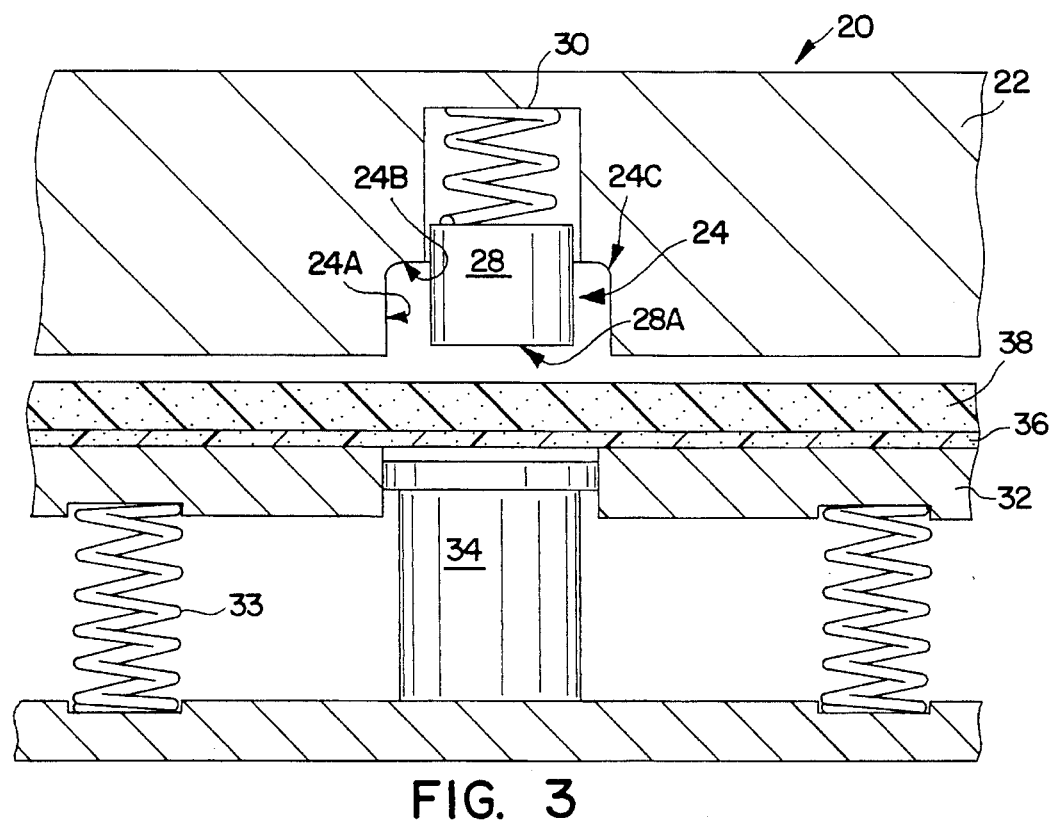
FIG. 3 is a cross-sectional view of the mold 20 in the completely open position showing the first half 22, the second half 32, the sheet of base material 36 and the sheet of cushion material 38.
Figure 4:
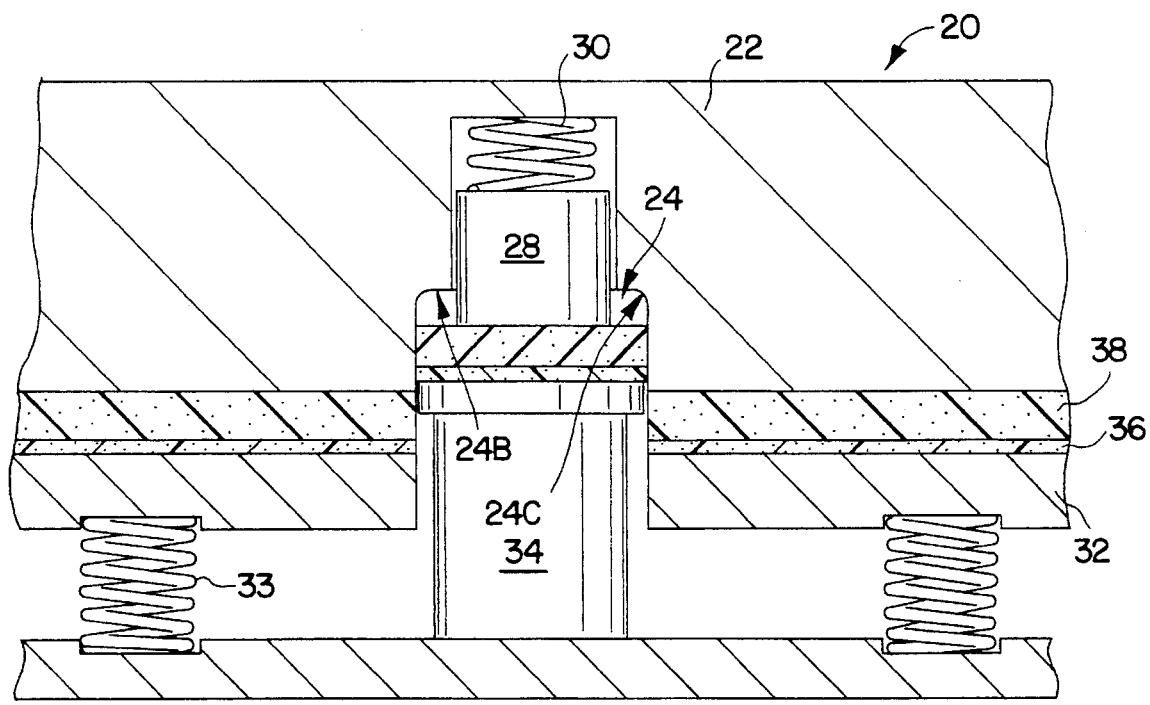
FIG. 4 is a cross-sectional view of the mold 20 in the partially closed position.
Figure 5:
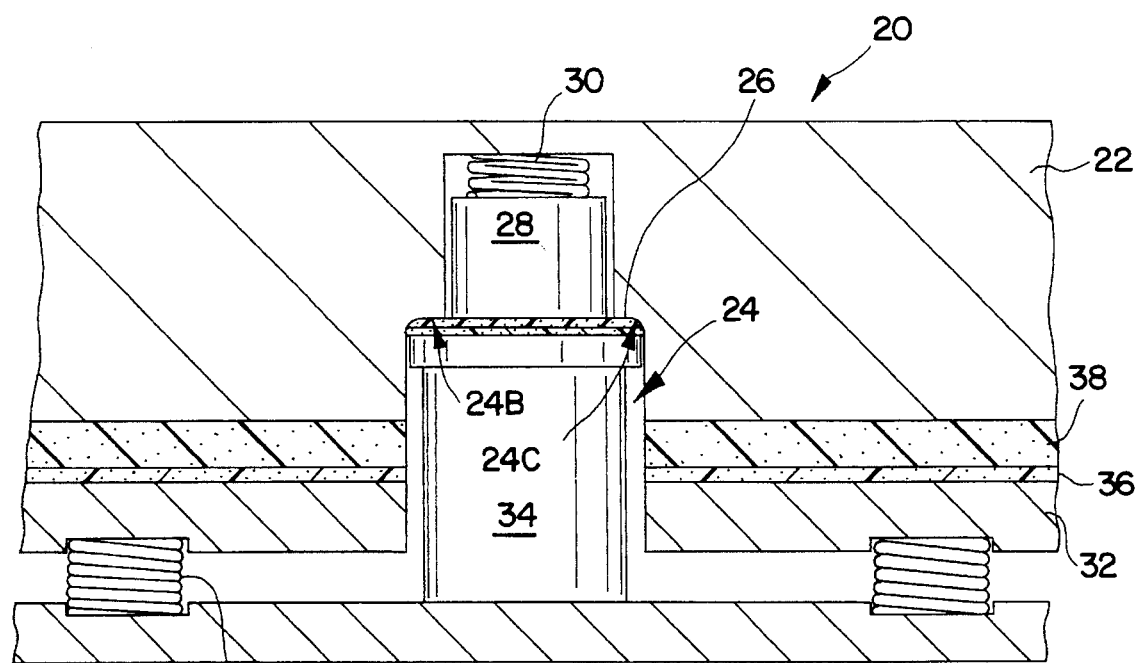
FIG. 5 is a cross-sectional view of the mold 20 in the completely closed position showing the cut wrist support preform 26 in contact with the top 24B and the curved portion 24C of the indentation 24 of the first half 22 of the mold 20.
Figure 7:
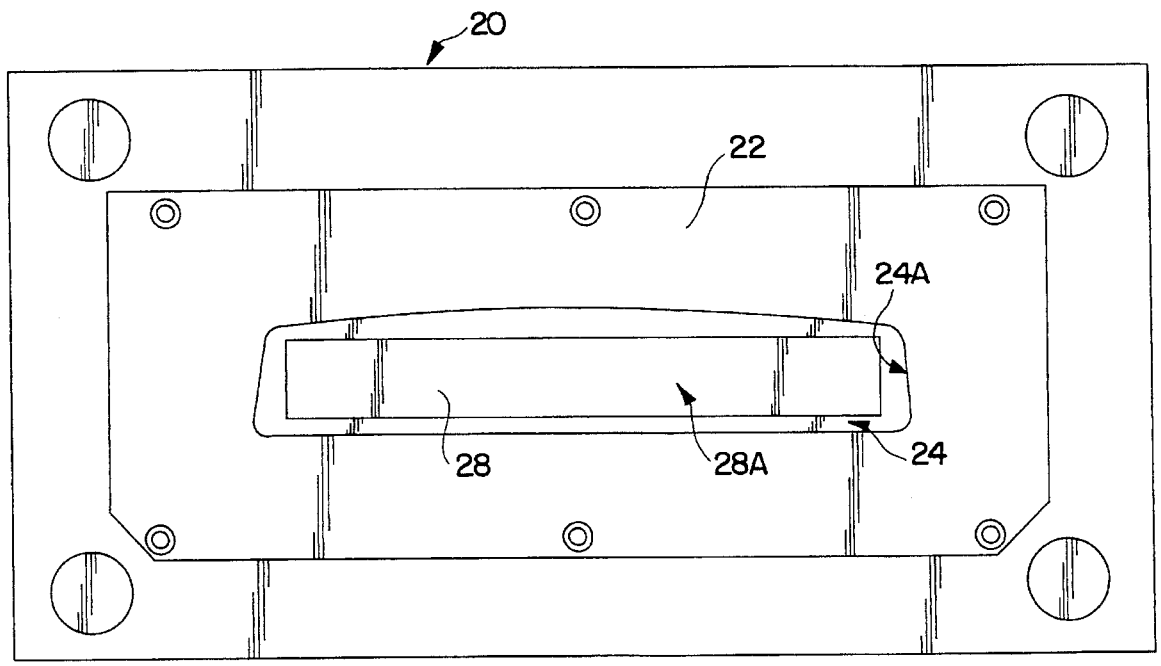
FIG. 7 is a bottom view of the first half 22 of the mold 20 showing the ejector 28 in the indentation 24.

The indentation 24 of the first half 22 of the mold 20 is provided with an ejector 28 which is biased by a spring 30 into the indentation 24 of the first half 22 of the mold 20 (FIGS. 3 to 5). The ejector 28 preferably is considerably smaller in size than the indentation 24 and does not extend beyond the opening of the indentation 24 (FIG. 7). The ejector 28 is mounted into the first half 22 of the mold 20 such that as the plunger 34 of the second half 32 enters the indentation 24 of the first half 22, the ejector 28 is pushed upward into the first half 22 of the mold 20. Preferably, the ejector 28 is able to retract fully into the first half 22 of the mold 20 such that the top surface 28A of the ejector 28 is flush with the top 24B of the indentation 24 when the mold 20 is fully closed (FIG. 5).

Figure 6:
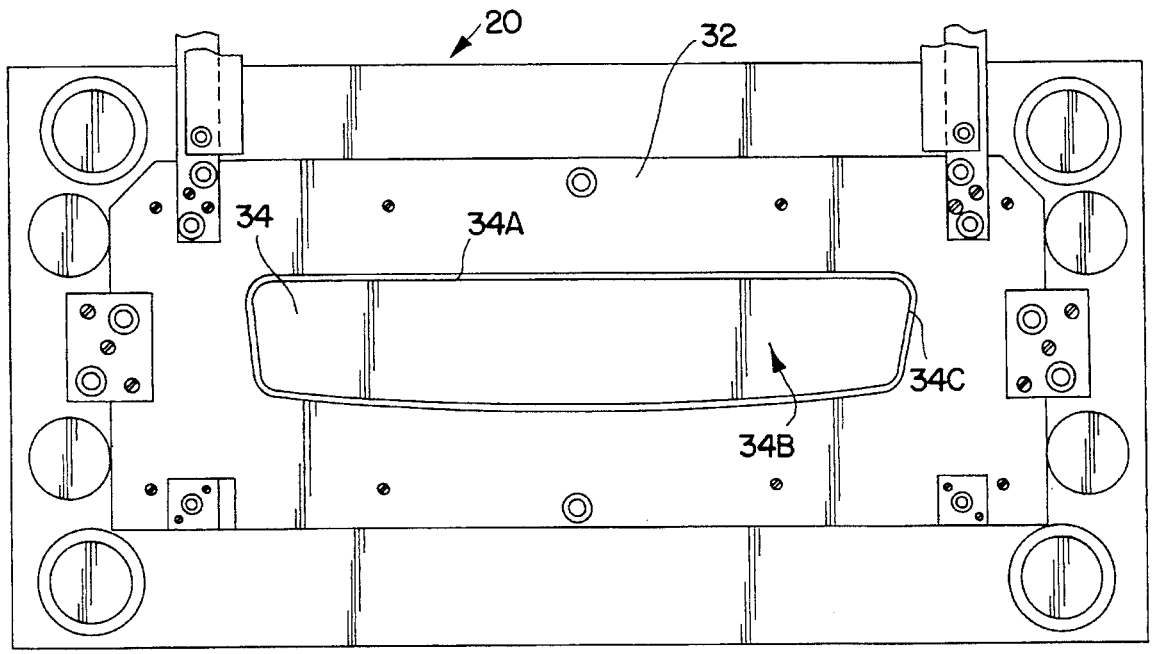
FIG. 6 is a top view of the second half 32 of the mold 20 showing the cutting edges 34C of the sidewall 34A of the plunger 34.

The second half 32 of the mold 20 includes a plunger 34 similar in shape and only slightly smaller than the indentation 24 in the first half 22 of the mold 20. Thus, when the first half 22 and the second half 32 of the mold 20 are moved together, the plunger 34 of the second half 32 is able to extend into the indentation 24 of the first half 22. The second half 32 of the mold 20 is mounted on springs 33 which bias the second half 32 of the mold 20 toward the first half 22 of the mold 20. The plunger 34 preferably has four sidewalls 34A which form a perimeter around an open center 34B. The upper ends of the sidewalls 34A have cutting edges 34C which cut the sheets of base material 36 and cushion material 38 to form the cut base 12 and cut cushion layer 14 of the wrist support preform 26 (FIG. 6).

To form the wrist support 10 using the molding process, a sheet of base material 36 and a sheet of cushion material 38 are provided and mounted together. The sheet of base material 36 and the sheet of cushion material 38 are preferably fastened together by an adhesive (not shown), although other fastening means may be used. In the preferred embodiment, the sheet of base material 36 is provided with the adhesive 13 and the release paper 15 prior to the molding process. The sheets of material 36 and 38 are placed between the spaced apart halves 22 and 32 of the mold 20. Preferably in the initial position, the first half 22 of the mold 20 is spaced above the second half 32 of the mold 20 (FIG. 3). The sheets 36 and 38 are positioned in the mold 20 such that the base 12 is adjacent the second half 32 of the mold 20. The first and second half 22 and 32 of the mold 20 are then moved together (FIG. 4). In the preferred embodiment, the first half 22 of the mold 20 moves downward and makes contact with the sheet of cushion material 38. As the first half 22 continues to move downward, the second half 32 of the mold 20 is moved downward by the force of the first half 22. As the second half 32 of the mold 20 moves downward, the plunger 34 remains stationary such that the plunger 34 extends upward into the indentation 24 of the first half 22 of the mold 20. The first and second halves 22 and 32 of the mold 20 are moved together with a force of 75 tons. As the plunger 34 enters the indentation 24, the small distance between the four sidewalls 34A of the plunger 34 and the four sidewalls 24A of the indentation 24 causes a shearing action which enables the cutting edges 34C on the upper ends of the sidewalls 34A of the plunger 34 to cut the sheet of base material 36 and the sheet of cushion material 38 simultaneously (FIG. 4). By simultaneously cutting the sheets of base material 36 and cushion material 38, the problems of proper alignment of the sheets 36 and 38 during cutting are eliminated. After cutting the sheets 36 and 38, the first half 22 of the mold 20 continues downward such as to cause the plunger 34 to continue upward further into the indentation 24, compressing the newly formed base 12 and cushion layer 14 against the top 24B of the indentation 24 until the first half 22 and second half 32 of the mold 20 are in the fully closed position and the plunger 34 is completely within the indentation 24. When the plunger 34 is fully within the indentation 24, the base 12 and cushion layer 14 are compressed against the top 24B of the indentation 24 of the first half 22 of the mold 20 such that the edges 12C of the base 12 are in contact with the curved portion 24C of the indentation 24 (FIG. 5). The cushion layer 14 becomes fully compressed but is unaffected by the compression process. The base 12 contrastly is deformed by the high pressure compression which forces the edges 12C of the base 12 against the curved portion 24C of the indentation 24. The contact of the cut edges 12C of the base 12 with the curved portion 24C of the indentation 24 causes the cut edges 12C to be rounded upward toward the top surface 12A of the base 12. The large amount of force used during the molding process causes the base 12 to be deformed instantaneously as soon as the mold 20 is completely closed. The molding process is conducted at a high rate of speed such that the cutting of the sheets 36 and 38 and the molding of the base 12 appear to occur simultaneously. The first half 22 and the second half 32 of the mold 20 are then moved apart. As the first half 22 of the mold 20 is moved upward, the second half 32 of the mold 20 is biased into the original position by the springs 33. Once the pressure of the plunger 34 is removed from the indentation 24, the spring 30 of the ejector 28 biases the ejector 28 into the indentation 24 which moves the wrist support preform 26 out of the indentation 24 of the first half 22 of the mold 20. When removed from the mold 20, the cushion layer 14 returns to its original cut size. The rounded edges 12C of the base 12 however are permanently deformed. Thus, the cushion layer 14 extends over the rounded edges 12C and is able to be moved such as with the outer covering 16 to completely extend over and around the cut and rounded edges 12C of the base 12 (FIG. 2). While the rounded edges 12C of the base 12 enable the cushion layer 14 to extend over the edges 10A, 10B and 10C of the wrist support 10, the rounded edges 12C also add to the comfort of the user by eliminating sharp corner edges. The rounded edges 12C also reduce stress and wear on the outer covering 16 at the edges 10A, 10B and 10C of the wrist support 10. The outer covering 16 is positioned over the wrist support preform 26 and is pulled taut. The release paper 15 is removed to expose the adhesive 13 and the outer covering 16 is secured onto the bottom surface 12B of the base 12. The wrist support 10 is now able to be mounted on a variety of adapters for various different keyboard accessories (not shown). Preferably, a second adhesive (not shown) is applied to the bottom surface 12B of the base 12 including the portion of the outer covering 16 secured to the bottom surface 12B of the base 12. The second adhesive is used to secure the wrist support 10 onto the adaptor for the different keyboard accessories.

It is intended that the foregoing description be only illustrative of the present invention and that the present invention be limited only by the hereinafter appended claims.

I claim:

1. A method for constructing a wrist support preform constructed to be mounted adjacent a keyboard, the wrist support having a base with a top surface and a bottom surface with cut edges rounded upward and inward toward the top surface around a perimeter of the base and a cut cushion layer mounted on the top surface of the base and conforming to the shape of the base and extending around and over the cut edges of the base, which comprises:

(a) providing a sheet of a base material having a top surface and a bottom surface and a sheet of cushion material in a mold means having a first half and a second half movable between an open position with the first and second half of the mold separated and a closed position with the first and second half of the mold in contact, the first half having an indentation with sides and a top similar in shape and size to the wrist support with a curved portion between the top and the sides of the indentation and the second half having a plunger which is extendable into the indentation of the first half when the first and second half of the mold are positioned together with the mold in the closed position and with the base adjacent the plunger;

(b) moving the first half and the second half of the mold together, wherein the mold cuts the sheet of base material and cushion material to form the cut cushion material and cut base and rounds the edges of the base inward towards the top surface of the base to form the wrist support preform; and (c) removing the cut base with the cut cushion layer from the mold.

2. The method of claim 1 wherein the plunger of the second half of the mold is the same shape and only slightly smaller than the indentation of the first half of the mold.

3. The method of claim 1 wherein the first and second half of the mold are moved together with a force of about 75 tons so that the cut edges of the base are deformed and rounded upward due to contact with the curved portion of the indentation of the first half of the mold.

4. The method of claim 3 wherein the cut edges of the base are deformed and rounded upward instantaneously when the mold reaches the fully closed position.

5. The method of claim 2 wherein the sheets of base material and cushion material are cut by a shearing action when the plunger of the second half of the mold enters the indentation of the first half of the mold.

6. The method of claim 1 wherein after step (e) an outer covering is mounted over the cut cushion layer and around the cut edges of the cushion layer and the base to form the wrist support.

7. The method of claim 6 wherein the bottom surface of the base has an adhesive which is protected by a release paper and wherein the release paper is removed to secure the outer covering adjacent the bottom surface of the base.

8. A method for constructing a wrist support constructed to be mounted adjacent a keyboard, the wrist support having a base with a top surface and a bottom surface with cut edges rounded upward and inward towards the top surface around a perimeter of the base, a cut cushion layer mounted on the top surface of the base and conformed to the shape of the base and extending around and over the cut edges of the base and an outer covering surrounding the base and the cushion layer, which comprises:

(a) providing a sheet of a base material having a top surface and a bottom surface and a sheet of a cushion material in a mold having a first half and a second half movable between an open position with the first and second half of the mold separated and a closed position with the first and second half of the mold in contact, the first half having an indentation with sides and a top similar in shape and size to the wrist support with a curved portion between the top and the sides of the indentation and the second half having a plunger which is extendable into the indentation of the first half when the first and second half of the mold are positioned together with the mold in the closed position and with the base adjacent the plunger;

(b) moving the first half and the second half of the mold together, wherein the mold cuts the sheet of the base material and cushion material to form the cut cushion layer and the cut base and rounds the cut edges of the base inward towards the top surface of the base to form the wrist support;

(c) removing the cut base and cut cushion layer from the mold means;

(d) mounting an outer covering over the cushion layer of the wrist support and around the rounded edges of the base wherein the outer covering moves the cut edges of the cushion layer over and around the rounded edges of the cut base; and (e) securing the outer covering adjacent the bottom surface of the base.

9. The method of claim 8 wherein the plunger of the second half of the mold is the same shape and only slightly smaller than the indentation of the first half of the mold.

10. The method of claim 8 wherein the first and second half of the mold are held together with a force of about 75 tons so that the cut edges of the base are deformed and rounded upward due to contact with the curved portion of the indentation of the first half of the mold.

11. The method of claim 10 wherein the cut edges of the base are deformed and rounded upward instantaneously when the mold reaches the fully closed position.

12. The method of claim 9 wherein the sheets of base material and cushion material are cut by a shearing action when the plunger of the second half of the mold enters the indentation of the first half of the mold.

13. The method of claim 8 wherein the bottom surface of the base has an adhesive which is protected by a release paper and wherein the release paper is removed from the base before the outer covering is secured adjacent the bottom surface of the base.

* * * * *

UNITED STATES PATENT AND TRADEMARK OFFICE
CERTIFICATE OF CORRECTION

PATENT NO. : 5,582,787
DATED : December 10, 1996
INVENTOR(S) : Jeffrey D. Tyner

It is certified that error appears in the above-indentified patent and that said Letters Patent is hereby corrected as shown below:

Column 8, line 21 (Claim 6), "step (e)" should read --step (c)--.

Signed and Sealed this

Eleventh Day of March, 1997

*Attest:*

BRUCE LEHMAN

*Attesting Officer*  *Commissioner of Patents and Trademarks*